Patented May 11, 1943

2,318,999

UNITED STATES PATENT OFFICE 2,318,999

CONDITIONING OR TREATMENT OF WHEAT PRIOR TO MILLING

Charles Robert Jones and Arthur Goodyear Simpson, Saint Albans, England, assignors to The Research Association of British Flour Millers, London, England No Drawing. Application December 19, 1939, Serial No. 309,962. In Great Britain December 23, 1938

6 Claims. (Cl. 83—27)

This invention relates to the treatment of wheat prior to flour-milling.

What is known as the "wheat bug" (Eurygaster and Aelia spp.) so damages the baking properties of wheat that it can be used only in reduced, or even very small, proportions in millers' wheat blends, and in some cases wheat has been found to be so spoilt by this bug-action that it was dangerous to use more than about 2% of it in a normal wheat mixture, while the same type of wheat, free from such damage, could be used at the rate of, say, 25% or even more, in such a wheat mixture; moreover, it is difficult to tell by mere inspection to what extent wheat may be damaged by bug-attack.

It has been found that by suitable heat treatment depreciation in baking properties of bug-attacked wheat may be prevented entirely and the wheat employed in a wheat blend in the usual proportion.

It is well known that if wheat be heated to a sufficiently high temperature (about 145° F.) for a sufficiently long time, depending on the moisure content and temperature of the wheat, its baking properties are damaged or even destroyed.

If attempts be made to cure the damage to wheat caused by bug-attack by heating it to sufficiently high temperatures in the well known radiator or hot-air type of wheat conditioner, then, owing to the slowness of heating up wheat in such machines, the interior and exterior of the grain are similarly heated and under such conditions the wheat is subjected to sufficiently high temperatures for a sufficient time to destroy the baking properties of the wheat, before the still higher temperatures, at which the effects of bug damage are curable, are reached.

It is also known to subject grain to the action of boiling water, superheated steam or hot air for from 5 to 15 minutes to remove and destroy any impurities and also to cook the glutinous and starchy substance of the grain and render the whole friable. Further it is known to boil grain in berry form for about an hour to destroy all insect life and remove the traces thereof.

The protracted heating involved in these known treatments, although it may, during a minor stage, cure the effects of bug attack, brings about, during a major stage, changes in the baking properties of the wheat which are undesirable and which it is one of the objects of this invention to avoid.

According to the present invention, and in order to cure the wheat of damage to its baking character caused by the attack of "wheat bug," wheat is heated suddenly to a temperature of from about 160° F. to about 212° F. for a period of from about 5 seconds to not more than two minutes and then cooled. Such treatment ensures that it is only the outer layers of the grain which are subjected to the high temperature, for the treatment is not of sufficient duration to enable the heat to reach the inner parts of the grains. This is of importance as it is generally considered that owing to the wheat bug attacking the grain from the outside, it is chiefly, or only, the outer layers of the endosperm which are damaged, hence, it is more important to subject just those outer layers to the high temperature without raising the temperature of the whole of the interior of the individual grains through the intermediate temperature zone at which the baking properties of the wheat are damaged.

This may be effected by suddenly plunging a stream of wheat into a suitably lagged tank containing water kept at the required temperature by the direct injection of steam into the water, or by other suitable means. The wheat may be removed from the tank by means of a worm rotating in a channel of perforated metal enclosed within a trough, inclined so that the extraneous hot water carried away by the wheat can run back into the tank. The moisture content of the wheat may be raised if desired, and the moistened wheat allowed to lie for any desired time before immersion in the hot water. Instead of a worm, other means for removing the wheat from the boiling water may be used, e. g. a system of elevator buckets. The time of immersion of the wheat in the hot water, which should not be less than 5 seconds nor longer than 2 minutes, may be varied by varying the level of the hot water in the tank, and therefore, the length of the inclined worm which is under water, or by other means. After removal from the hot water tank the wheat should be cooled, for which purpose cold water may be sprayed on to the wheat, say, before it enters the whizzer.

Alternatively the wheat may be heated suddenly to about 212° F. by injecting live steam into the mass of grain for instance, by passing steam pipes into a cylindrical or other vertical spout down which a stream of wheat passes, a cone-shaped valve being placed at the base of the spout, and attached to a lever controlled by a spring in such manner that a constant stream of wheat passes down the vertical spout, which is kept full of grain, the supply of steam being regulated so as to cause the wheat to be heated to 212° F. or other desired temperature.

If desired, steam may be directed by a jet or jets on to wheat carried past the jet or jets at a suitable speed.

It is recognised that the flour made from the layer of endosperm immediately beneath the bran, which in the process of flour milling appears as the lowest grade break flours, is of worse baking character than the flour from the centre of the grain; by treatment according to the present invention, the lower grade break flours are materially improved by suddenly bringing the grain to a high temperature for a short period and then cooling it.

Further, the milling of wheats after being subjected to sudden heating is improved, and the offals have better keeping qualities, presumably because the bran has been at least partially sterilised.

We claim:

1. A process for the treatment of wheat prior to milling to cure a form of damage to the baking character of wheat due to the attack of "wheat bug" (Eurygaster and Aelia spp.), which process consists in heating it suddenly to a temperature of from about 160° F. to about 212° F. for a period of from about 5 seconds to not more than two minutes, and then cooling it.

2. A process for the treatment of wheat prior to milling to cure a form of damage to the baking character of wheat due to the attack of "wheat bug" (Eurygaster and Aelia spp.), which process consists in heating it suddenly with moist heat to a temperature of from about 160° F. to about 212° F. for a period of from about 5 seconds to not more than two minutes, and then cooling it.

3. A process for the treatment of wheat prior to milling as claimed in claim 1, according to which the wheat is moistened to raise its moisture content and allowed to lie prior to its sudden heating.

4. A process for the treatment of wheat prior to milling as claimed in claim 1, according to which the wheat is heated suddenly by injecting live steam into a mass of grain.

5. A process for the treatment of wheat prior to milling to cure a form of damage to the baking character of wheat due to the attack of "wheat bug" (Eurygaster and Aelia spp.), which process consists in rapidly heating the wheat to a temperature not lower than 160° F. and not more than 212° F. by direct contact of live steam with the wheat for a period not less than 5 seconds and not exceeding two minutes, separating the heated wheat from water resulting from condensation of said steam, and thereafter subjecting the wheat to the action of cold water.

6. A process for the treatment of wheat prior to milling, as claimed in claim 1, according to which the wheat is heated suddenly by injecting live steam on to wheat carried, at a suitable speed, past the means whence the steam issues.

CHARLES ROBERT JONES.
ARTHUR GOODYEAR SIMPSON.